H. WENDT & H. SEYMOUR.
SHEEP SHEARS.
No. 3,583. Reissued Aug. 3, 1869.
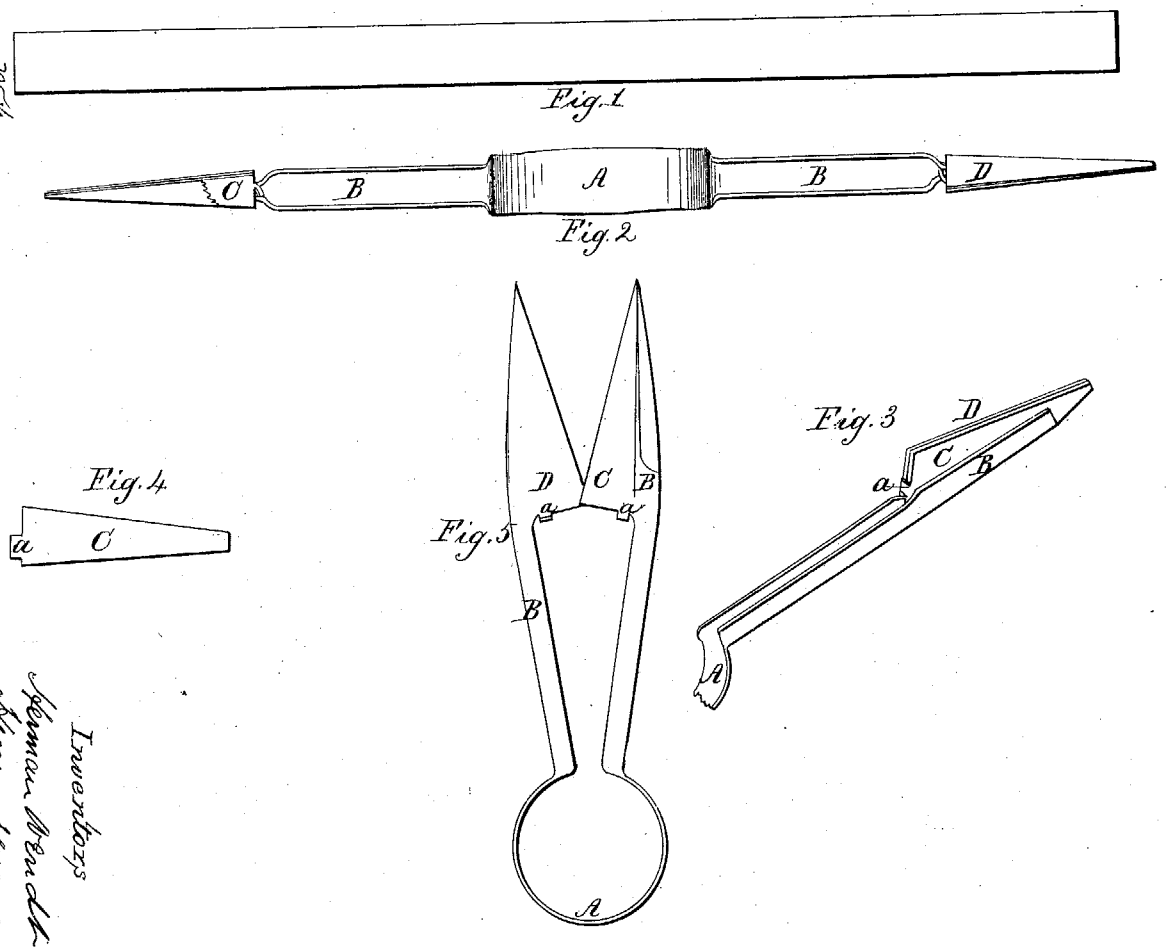
Witnesses
Henry Morris
E. L. Tapliff
Inventors
Herman Wendt
Henry Seymour
per Munn & Co
Attys
THE NORRIS PETERS CO., PHOTO-LITHO., WASHINGTON, D. C.

United States Patent Office.

HENRY SEYMOUR, OF NEW YORK, N. Y., ASSIGNEE OF HERMANN WENDT AND HENRY SEYMOUR.

*Letters Patent No.* 45,198, *dated November* 22, 1864; *reissue No.* 3,583, *dated August* 3, 1869.

IMPROVEMENT IN THE MANUFACTURE OF SHEEP-SHEARS.

The Schedule referred to in these Letters Patent and making part of the same.

*To all whom it may concern:*

Be it known that HERMANN WENDT and HENRY SEYMOUR, of Elizabeth, in the county of Union, and State of New Jersey, invented a new and useful Improvement in the Construction of Sheep-Shears; and that the following is a full, clear, and exact description thereof, reference being had to the accompanying drawings, and to the letters of reference marked thereon, and making a part of this specification.

In the manufacture of sheep-shears, the old English method is to forge them out of a bar of shear-steel, one half of the spring, one shank, and one blade being all in one piece and forming one half of the implement; the other half, after being made as the first, being forged or welded to the latter at or near the centre of the spring.

This, besides being a tedious and expensive process, involves the necessity of an inferior material (shear-steel) being necessarily used.

The American process of manufacture is an improvement on the English as regards economy in construction, and also as regards durability.

On account of these advantages, the American shears have superseded the English ones, and nearly driven them out of the market.

The former shears, (American,) as originally made, were composed of iron shanks and blade-plates, one shank and blade-plate, which comprise one half of the shears, being made or forged out of one piece of metal separately from the other half, and the two halves connected by the bow or spring, which is made separately from the parts above mentioned, and of steel, and connected to one end of the shanks by rivets. (See patent granted to W. H. White, May 6, 1862.)

This patent, granted to White, aforesaid, and the one granted to Wendt and Seymour, November 22, 1864, which is the subject of the present application for a reissue, comprise the two methods now in general use in this country for manufacturing sheep-shears, the former (White's) being comparatively little used.

The present invention consists in constructing the shanks and spring out of one piece of metal, at one operation, and constructing the blade-plates separately, and afterward connecting them to the shanks by welding or swaging, the blade-plates being of iron, and having cast-steel plates welded to them, as hereinafter fully set forth.

To enable those skilled in the art to fully understand and construct sheep-shears in accordance with the invention, the following description is given in connection with the accompanying drawings, of which—

Figure 1 is a plan view of the rolled sheet-iron blank, out of which the frame is made.

Figure 2 is a plan view, showing the appearance of the frame after it has been swaged into shape, with the rough blade-pieces, and the steel cutting-plates attached prior to welding.

Figure 3, a perspective view of one of the shanks or blade-holders, rough blade-pieces, and steel cutting-plate, prior to welding.

Figure 4, a side elevation of blade-back piece, with attached stops.

Figure 5, a side elevation of the finished shears.

Similar letters of reference indicate corresponding parts in the several figures.

A, fig. 1, represents a piece of strap, hoop, or rolled iron, of good quality, and of the proper length and width.

This iron (stock) may be purchased of the suitable width and thickness, and in long pieces or strips, and then cut into suitable lengths, as required by the manufacturer.

These pieces of iron, which are technically termed "blanks" are first heated and then placed in a swaging-press, by which, at one blow or operation, the hammer or drop converts them into the form shown in fig. 2, in which $A^{\times}$ represents the spring, and B B the blade-shanks, the latter being about of semicircular form in their transverse section.

The cutting-blade plates C C are made out of separate pieces of rolled or sheet-metal.

The plate C, shown in fig. 4, is composed of sheet-iron, and forms a portion of the back of the blade.

Each plate, C, has at its rear end a projection or ear, *a*, and these ears, *a a*, form the usual stops employed to prevent the blades from passing each other.

In the ordinary process of manufacture, these stops or ears, *a a*, are made of separate pieces of metal welded upon the rear ends of the plates C C.

After the blank has been swaged into the form shown in fig. 2, the blade-plates C C are placed, one in each of the shanks B B, as shown in fig. 3, and against each plate C, thus arranged, but at the outer sides of the shanks B, a face or cutting-steel plate, D, similar in form to C, is placed, as shown in fig. 3, so as to form proper cutting-edges. These steel plates, D, are permanently connected to the iron plates C by welding.

The blades are finished by grinding and polishing upon stones in the ordinary manner, and when completed, the face of each cutting-edge is composed of cast-steel, backed by the iron plates C, both being held by the shanks B, and all united, as shown in fig. 5.

After the blank A has been swaged up, as before described, and represented in fig. 2, the part $A^{\times}$ which forms the spring, is hammered out so as to condense and harden the metal.

This hammering also renders said part or spring $A^{\times}$ wider, and likewise imparts to it a sufficient degree of elasticity to render it a good and durable spring.

The subsequent operations of polishing, tempering, setting the blades, and finishing, are done in the usual manner, and no particular description thereof is necessary.

Sheep-shears have been made by swaging or otherwise forming the shanks, spring, and blade-holders out of a single piece of metal, and afterward welding the cutting-edges to the blade-holders.

By this mode of manufacture, however, there is a great waste of metal, as the width of the blank must be equal to the width of the shank, added to the width of the offset of the blade-holder.

No claim is laid to this manufacture, as it forms no part of the invention herein described; indeed, the main object of my invention is to prevent the waste of metal in the blank, and is an improvement, in that respect, over the above manufacture.

Having thus described the invention,

What is claimed as new, and for which Letters Patent are desired, is—

Sheep-shears, consisting of the shanks and spring formed of a single piece of metal, and the blade-plates made separately, and afterward connected to the shanks by welding or swaging, said blade-plates being of iron, and having cast-steel plates welded to them, all constructed substantially as set forth.

HENRY SEYMOUR.

Witnesses:

A. R. HAIGHT,

WM. F. MCNAMARA.